United States Patent
Kawamoto

(10) Patent No.: US 7,499,204 B2
(45) Date of Patent: Mar. 3, 2009

(54) OPTICAL SCANNING APPARATUS, CONTROL METHOD THEREOF, AND IMAGE FORMING APPARATUS

(75) Inventor: Tomohiro Kawamoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/169,836

(22) Filed: Jul. 9, 2008

(65) Prior Publication Data

US 2009/0015892 A1 Jan. 15, 2009

(30) Foreign Application Priority Data

Jul. 9, 2007 (JP) .............................. 2007-180153

(51) Int. Cl.
  *G02B 26/08* (2006.01)
  *B41J 27/00* (2006.01)
(52) U.S. Cl. ........................ 359/202; 359/199; 359/201; 359/216; 347/260; 347/261
(58) Field of Classification Search ................ 359/199, 359/201–202
  See application file for complete search history.

(56) References Cited

U.S. PATENT DOCUMENTS 6,351,324 B1 * 2/2002 Flint ........................... 359/202
2004/0119813 A1 * 6/2004 Bush et al. ................... 347/259

FOREIGN PATENT DOCUMENTS

JP 2004-37757 A 2/2004

* cited by examiner

*Primary Examiner*—James Phan
(74) *Attorney, Agent, or Firm*—Rossi, Kimms & McDowell, LLP

(57) ABSTRACT

The light beam deflection cycle of a rotational polygonal mirror includes first and third sections in which a latent image is not formed, and a second section in which the latent image is formed. A driving signal supply unit supplies a driving signal of a frequency less than the resonance frequency of a resonant driving type mirror to the resonant driving type mirror in the first section. The driving signal supply unit keeps the deflection angle of the resonant driving type mirror at the first target deflection angle in the second section. The driving signal supply unit supplies a driving signal of a frequency less than the resonance frequency of the resonant driving type mirror to the resonant driving type mirror in the third section. The optical scanning apparatus is used in an image forming apparatus.

11 Claims, 13 Drawing Sheets

OPTICAL SCANNING APPARATUS, CONTROL METHOD THEREOF, AND IMAGE FORMING APPARATUS

BACKGROUND OF THE INVENTION

1. Field of the Invention

The present invention relates to an optical scanning apparatus that includes a function for controlling dot positions in a sub-scanning direction, a control method of the optical scanning apparatus, and an image forming apparatus.

2. Description of the Related Art

In general, an image forming apparatus forms a latent image by deflecting a light beam using a polygonal mirror and repeatedly scanning the surface of a photosensitive drum with that light beam. Such scanning shall be referred to as "main scanning" hereinafter. Furthermore, the linear-shaped latent image formed by this main scanning shall be referred to as a "main scanning line".

An image forming apparatus typically performs a single main scan for a single surface of the polygonal mirror, thereby forming a single main scanning line. For example, when a polygonal mirror having four reflective surfaces is used, and that polygonal mirror rotates once, four main scans are performed, thereby forming four main scanning lines. It is of course preferable for the four main scanning lines to be formed at equal intervals, but in reality these intervals are not equal. This is called "unevenness of pitch" in the sub-scanning direction.

A conventional invention for reducing unevenness of pitch of the main scanning lines caused by unevenness of rotation of the photosensitive drum, unevenness of rotation of a transfer belt, and so on, has been proposed (Japanese Patent Laid-Open No. 2004-37757). According to this invention, unevenness of pitch is corrected by disposing a micromirror, which is capable of minute resonance at a slower rate than the main scanning frequency, within the optical path. Such a technique allows useful correction effects to be obtained with respect to "unevenness of pitch caused by low-frequency components" resulting from "sinusoidal undulations" in the sub-scanning direction.

FIG. 14 is a diagram illustrating this "unevenness of pitch caused by low-frequency components" resulting from "sinusoidal undulations", which is caused by unevenness of pitch of the main scanning lines caused by unevenness of rotation of the photosensitive drum, unevenness of rotation of a transfer belt, and so on.

However, there are other factors that lead to unevenness of pitch. While it is preferable to prepare the polygonal mirror so that its reflective surfaces each have equal inclination angles relative to the rotational axis, this is, in reality, difficult to accomplish, in terms of the manufacturing accuracy. Slight differences thus arise in the inclination angles of the reflective surfaces. Such differences in the inclination angles shall be referred to as "surface inclination" hereinafter. This surface inclination leads to ununiformity in the reflection angles of the light beam, and unevenness of pitch in the main scanning lines occurs as a result.

The unevenness of pitch in the main scanning lines caused by the surface inclination occurs at the same speed as the main scanning frequency (several kHz), and thus does not occur slowly compared to the main scanning frequency. Accordingly, in the present specification, this shall be called "unevenness of pitch caused by high-frequency components" rather than "unevenness of pitch caused by low-frequency components".

FIG. 15 is a diagram illustrating an example of unevenness of pitch in the main scanning lines caused by surface inclination (that is, unevenness of pitch caused by high-frequency components). While the unevenness of pitch illustrated in FIG. 14 has a frequency of approximately several Hz to several tens of Hz, the unevenness of pitch illustrated in FIG. 15 has a frequency of several kHz, and thus the two are clearly substantially different from one another.

Meanwhile, the unevenness of pitch in the main scanning lines caused by surface inclination in the polygonal mirror has a square-wave shape. Therefore, such unevenness of pitch is not caused by the "sinusoidal undulations", such as unevenness of pitch of the main scanning lines caused by unevenness of rotation of the photosensitive drum, unevenness of rotation of a transfer belt, and so on (see FIG. 15). Accordingly, because the sub-scanning unevenness of pitch is square wave in form, a resonant driving type micromirror cannot sufficiently correct the unevenness of pitch when being driven by a sine wave.

However, if the resonant driving type micromirror can be driven by a square wave, it seems possible to reduce the unevenness of pitch caused by the surface inclination. However, as illustrated in FIG. 16, an oscillation phenomenon (indicated by the ovals in FIG. 16) occurs when the resonant driving type micromirror is simply driven by a square wave. It takes approximately 100 ms for this oscillation phenomenon to subside, making it extremely difficult to effectively correct unevenness of pitch occurring in the main scanning cycle, which is several hundred µs.

SUMMARY OF THE INVENTION

It is therefore a feature of the present invention to solve at least one of these and other problems. For example, it is a feature of the present invention to positively correct "square wave form" "unevenness of pitch caused by high-frequency components" arising due to surface inclination by using a resonant driving type mirror, while also suppressing oscillation phenomena. Means to solve the other problems shall become apparent throughout the course of the following descriptions.

The present invention can be applied in, for example, an optical scanning apparatus that forms a latent image upon a photosensitive member. A rotational polygonal mirror is provided with a plurality of reflective surfaces that deflect a light beam in a main scanning direction. A resonant driving type mirror deflects the light beam in a sub-scanning direction so as to reduce the influence of surface inclination in the reflective surfaces of the rotational polygonal mirror relative to the rotational axis of the rotational polygonal mirror. The light beam deflection cycle of the rotational polygonal mirror includes a first section in which the latent image is not formed, a second section that follows the first section and in which the latent image is formed, and a third section that follows the second section and in which the latent image is not formed. A driving signal supply unit supplies a driving signal of a frequency less than the resonance frequency of a resonant driving type mirror to the resonant driving type mirror in the first section, in order to bring the deflection angle of the resonant driving type mirror to a first target deflection angle. The driving signal supply unit keeps the deflection angle of the resonant driving type mirror at the first target deflection angle in the second section. The driving signal supply unit supplies a driving signal of a frequency less than the resonance frequency of the resonant driving type mirror to the resonant driving type mirror in the third section, in order to bring the deflection angle of the resonant driving type mirror to a second target deflection angle. The optical scanning apparatus is used in an image forming apparatus.

Further features of the present invention will become apparent from the following description of an exemplary embodiment (with reference to the attached drawings).

BRIEF DESCRIPTION OF THE DRAWINGS

FIG. 14 is a diagram illustrating "unevenness of pitch caused by low-frequency components" resulting from "sinusoidal undulations", which is caused by unevenness of pitch of the main scanning lines caused by unevenness of rotation of a photosensitive drum, unevenness of rotation of a transfer belt, and so on.

DESCRIPTION OF THE EMBODIMENTS

An embodiment of the present invention shall be described hereinafter. The embodiment described hereinafter is useful in understanding the broader, intermediate, and more limitative concepts of the present invention. However, it should be noted that the technical scope of the present invention is defined by the appended claims, and is not intended to be limited by the individual embodiment described hereinafter.

Figure 1:
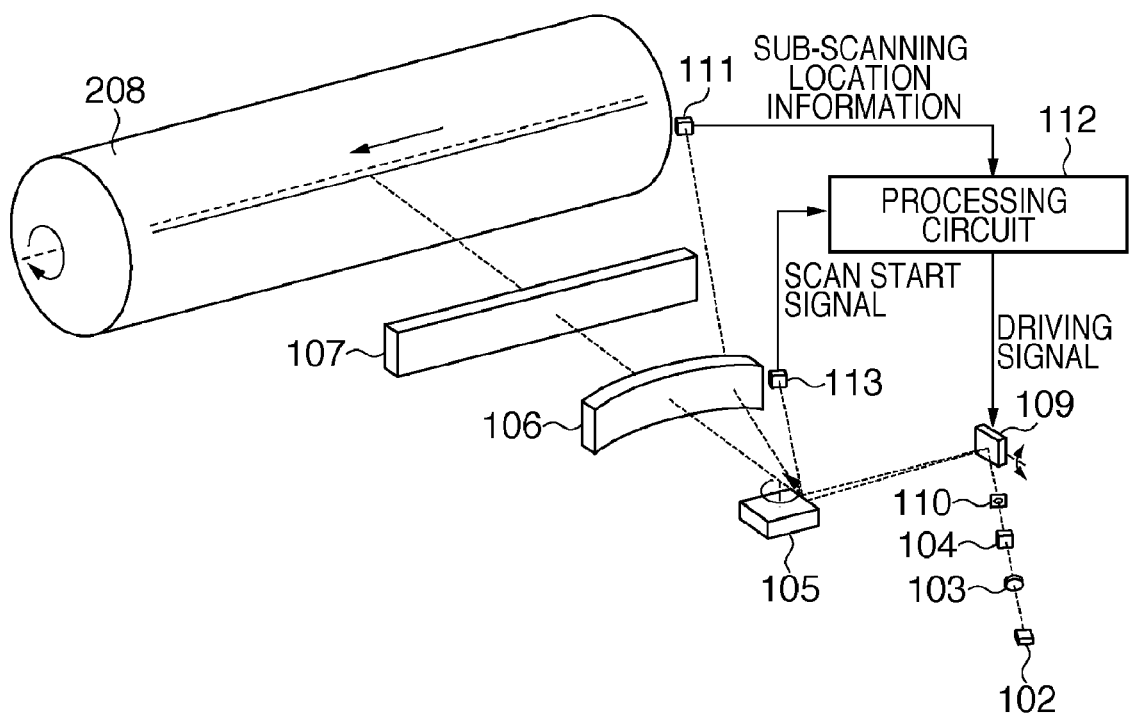
FIG. 1 is a diagram illustrating an example of an optical scanning apparatus and part of an image forming apparatus according to an embodiment.

FIG. 1 is a diagram illustrating an example of an optical scanning apparatus and part of an image forming apparatus according to the embodiment. A light beam emitted from a light source 102 passes through a collimator lens 103, a cylinder lens 104, and a beam-shaping slit 110, and then enters into a micromirror 109. The light beam may be called a "laser beam", "luminous flux", or may simply be referred to as "light". The light source 102 is, for example, a semiconductor laser, an LED, or the like.

The micromirror 109 is an example of a resonant driving type mirror, and is also referred to as an optical deflection element. The micromirror 109 may have a characteristic whereby when a square wave form driving signal is input into the micromirror 109, it oscillates on at least one of the rising edge of the square wave form driving signal and the falling edge of the square wave form driving signal. While the present invention is useful in cases where this characteristic exists, the present invention may also be applied to a resonant driving type mirror that does not have such a characteristic. Note that the micromirror 109 is an example of a resonant driving type mirror that deflects a light beam in the sub-scanning direction so as to reduce the influence of surface inclination in the reflective surfaces of a rotational polygonal mirror relative to the rotational axis of that rotational polygonal mirror.

The light beam for which the position of the sub-scanning direction has been corrected by the micromirror 109 enters into a rotating polygonal mirror 105. Note that the polygonal mirror 105 is an example of a rotational polygonal mirror provided with a plurality of reflective surfaces that deflects a light beam in the main scanning direction. Note that a resonant driving type mirror may be employed instead of the polygonal mirror 105. The light beam reflected by the polygonal mirror 105 passes through an fθ lens 106 and an LDE lens 107, and scans the surface of a rotating photosensitive drum 108. A latent image is then formed on the surface of the photosensitive drum 108 by repeating this series of operations. The photosensitive drum 108 is an example of a photosensitive member, on the surface of which a latent image is formed by the light beam outputted from the optical scanning apparatus.

A position detection sensor 111 is disposed in the vicinity of the photosensitive drum 108, and detects the position of each main scanning line in the sub-scanning direction (the sub-scanning position). The sub-scanning position differs with each reflective surface of the polygonal mirror 105 depending on the amount of surface inclination of that reflective surface. For this reason, the position detection sensor 111 detects the amount of surface inclination of each reflective surface. The position detection sensor 111 outputs pulse signals of different widths in accordance with the position at which the light beam passes in the sub-scanning direction. Therefore, if a counter or the like is used to detect the width of the pulse signal, the sub-scanning position can be detected based on the detected width. A light detection sensor 113 outputs a scan start signal each time it detects the light beam. The scan start signal is thus output for each reflective surface of the polygonal mirror 105, or in other words, once per deflection cycle. The position detection sensor 111 is therefore an example of a detection unit that detects the sub-scanning position of a light beam per reflective surface.

A processing circuit 112 uses the results of detecting the sub-scanning position obtained from the position detection sensor 111 and the scan start signal obtained from the light detection sensor 113 to generate and output a driving signal that is to be supplied to the micromirror 109. The micromirror 109 alters the deflection angle θ in accordance with this driving signal.

Figure 2:
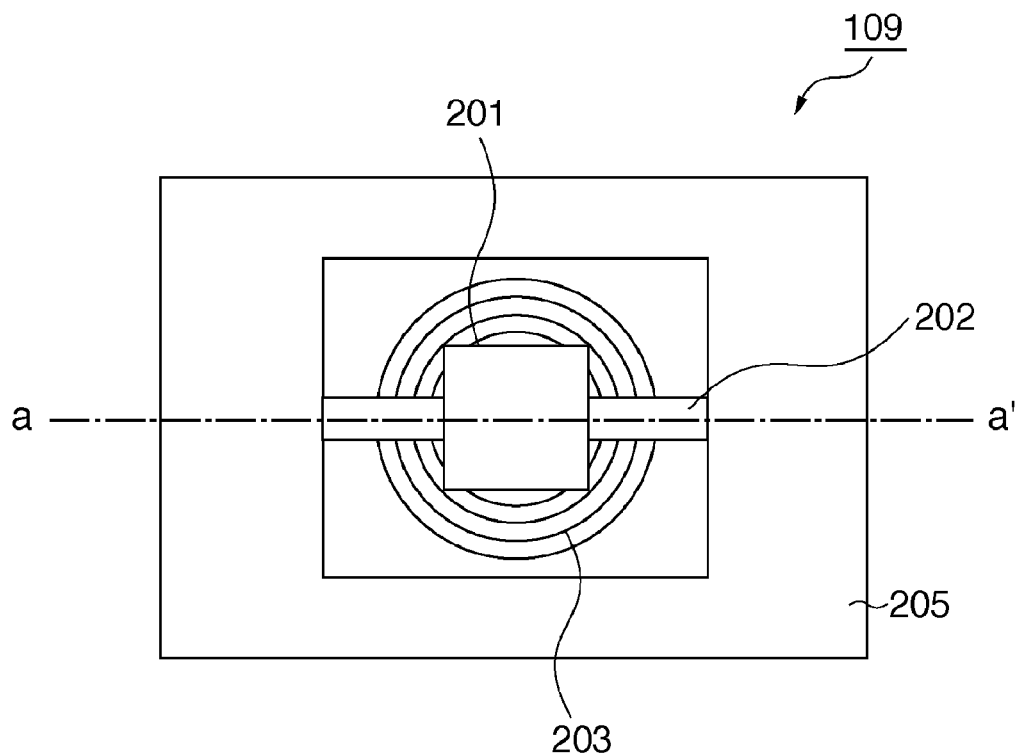
FIG. 2 is a plan view of a micromirror 109 according to an embodiment, as viewed from above (that is, from the mirror surface side).
Figure 3:
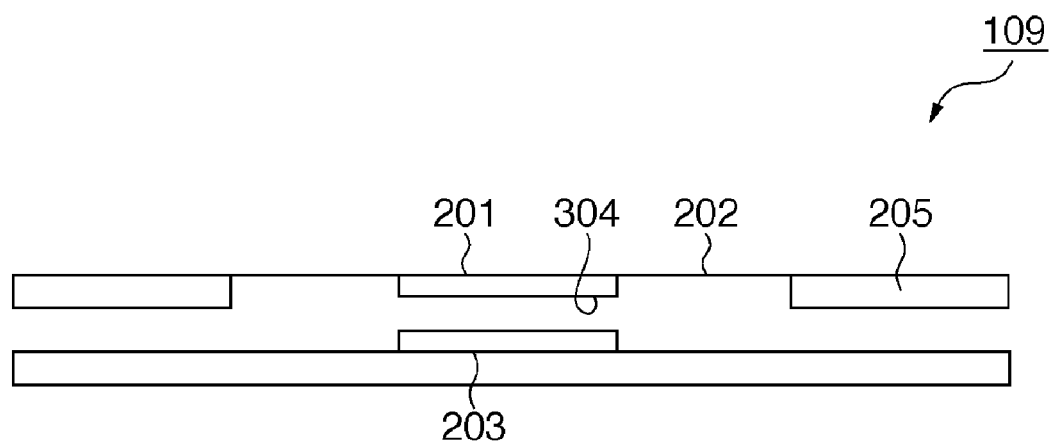
FIG. 3 is a cross-sectional diagram illustrating an optical deflection element as viewed along the a-a' line shown in FIG. 2.
Figure 4:
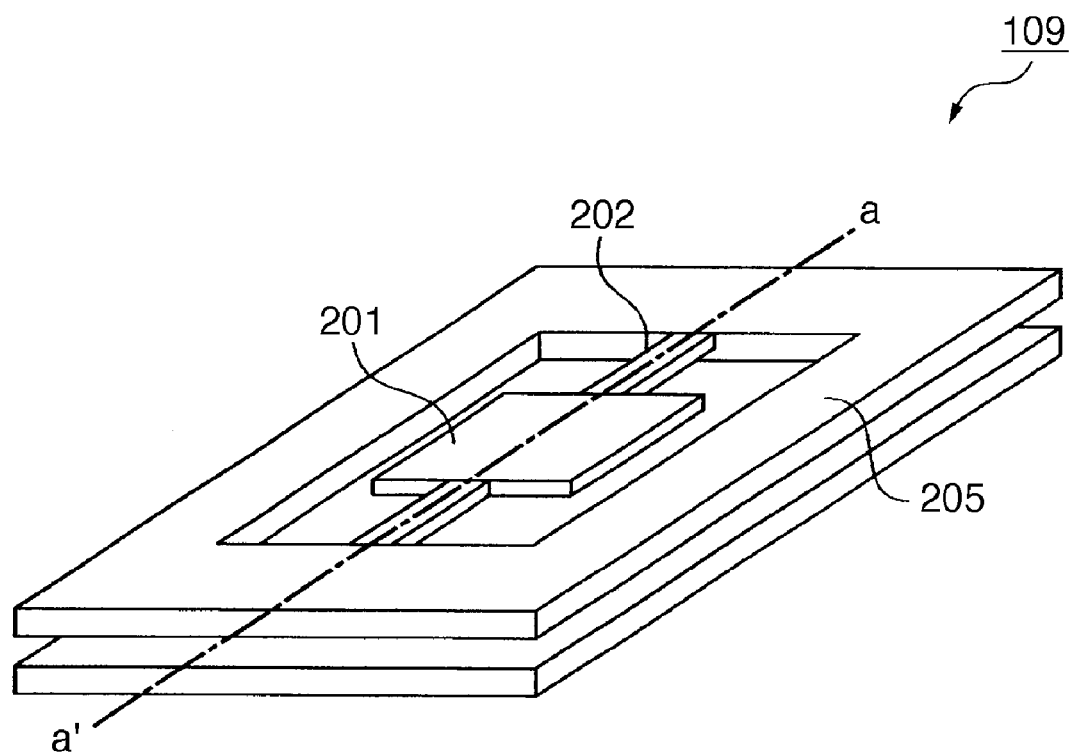
FIG. 4 is a perspective view illustrating a micromirror 109 according to an embodiment at an angle from above.

FIGS. 2, 3, and 4 are diagrams illustrating the configuration of the micromirror 109 according to the present embodiment. Of these, FIG. 2 is a plan view of the micromirror 109, as viewed from above (that is, from the mirror surface side); FIG. 3 is a cross-sectional diagram illustrating the optical deflection element as viewed along the a-a' line shown in FIG. 2; and finally, FIG. 4 is a perspective view illustrating the micromirror 109 at an angle from above. As illustrated in the diagrams, a mirror 201, on the rear surface of which is disposed a magnet 304, is supported on a frame 205 by a torsion bar 202. A magnetic field is generated by running an electric current through a coil 203 disposed opposite to the magnet 304; the mirror 201 deflects light as a result of that magnetic field and the magnetic field of the magnet 304.

The micromirror 109 illustrated in the present embodiment may have the same capabilities as, for example, an electrostatically-driven resonant micromirror, manufactured using a general semiconductor process. The micromirror 109 may also be a micromachine manufactured using a micromachining process. Such a process also provides a highly-responsive micromirror 109, and a level of manufacturing accuracy similar to that of the semiconductor process can be achieved as well.

Figure 5:
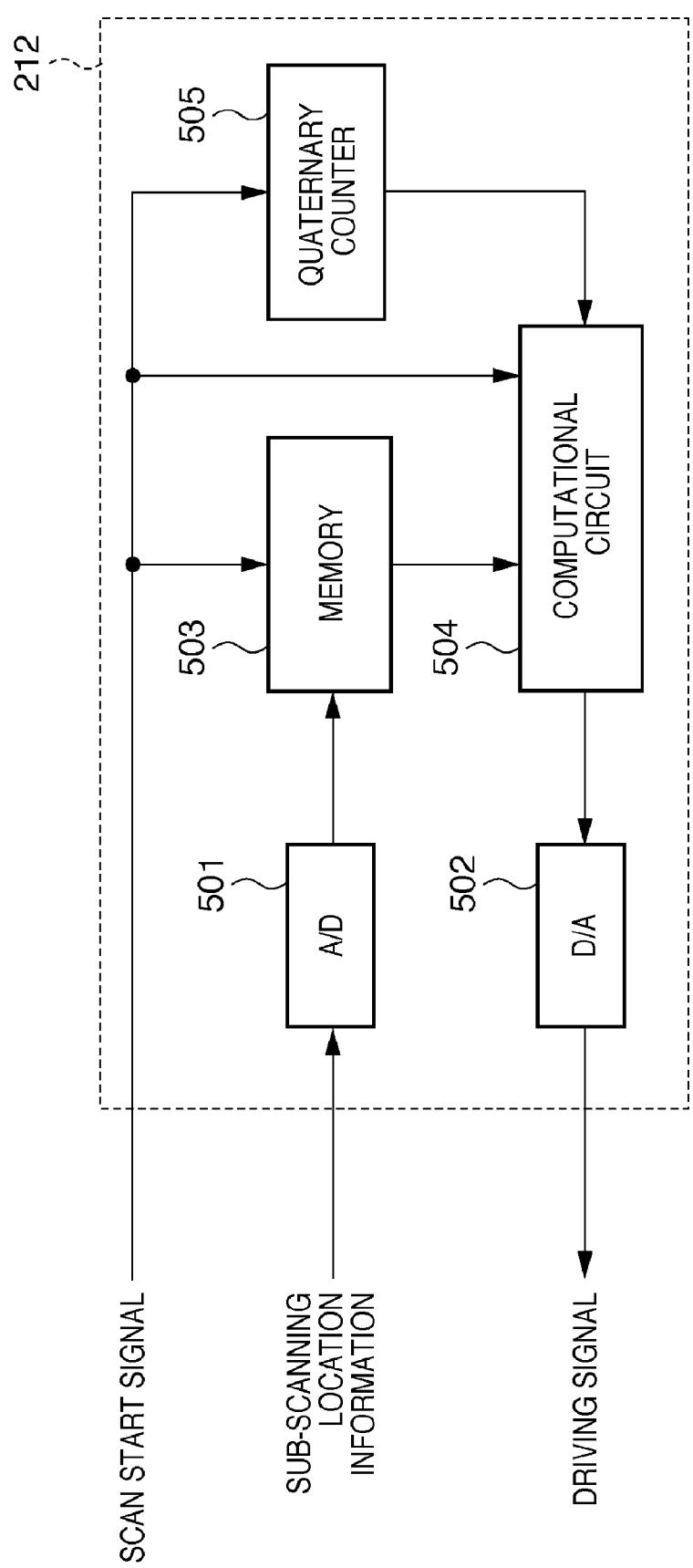
FIG. 5 is a block diagram illustrating an example of a processing circuit 112 according to an embodiment.

FIG. 5 is a block diagram illustrating an example of the processing circuit 112 according to the present embodiment. An A/D converter 501 converts the sub-scanning location information (an analog signal) output by the position detection sensor 111 into a digital signal, and stores the resulting digital signal in a memory 503. A D/A converter 502 converts a driving signal (a digital signal) determined by a computational circuit 504 into a driving voltage. The memory 503 is a storage device that stores sub-scanning location information, which is equivalent to the surface inclination amount per reflective surface. A quaternary counter 505 is a counter circuit that increments a count value with each input of the scan start signal, which indicates a change between reflective surfaces. The computational circuit 504 is an example of a driving signal supply unit that supplies the driving signal to the micromirror 109. The computational circuit 504 is realized by, for example, a generic CPU, an ASIC, a gate element, or the like.

(Sub-Scanning Location Information (Surface Inclination Amount) Acquisition Process)

Figure 6:
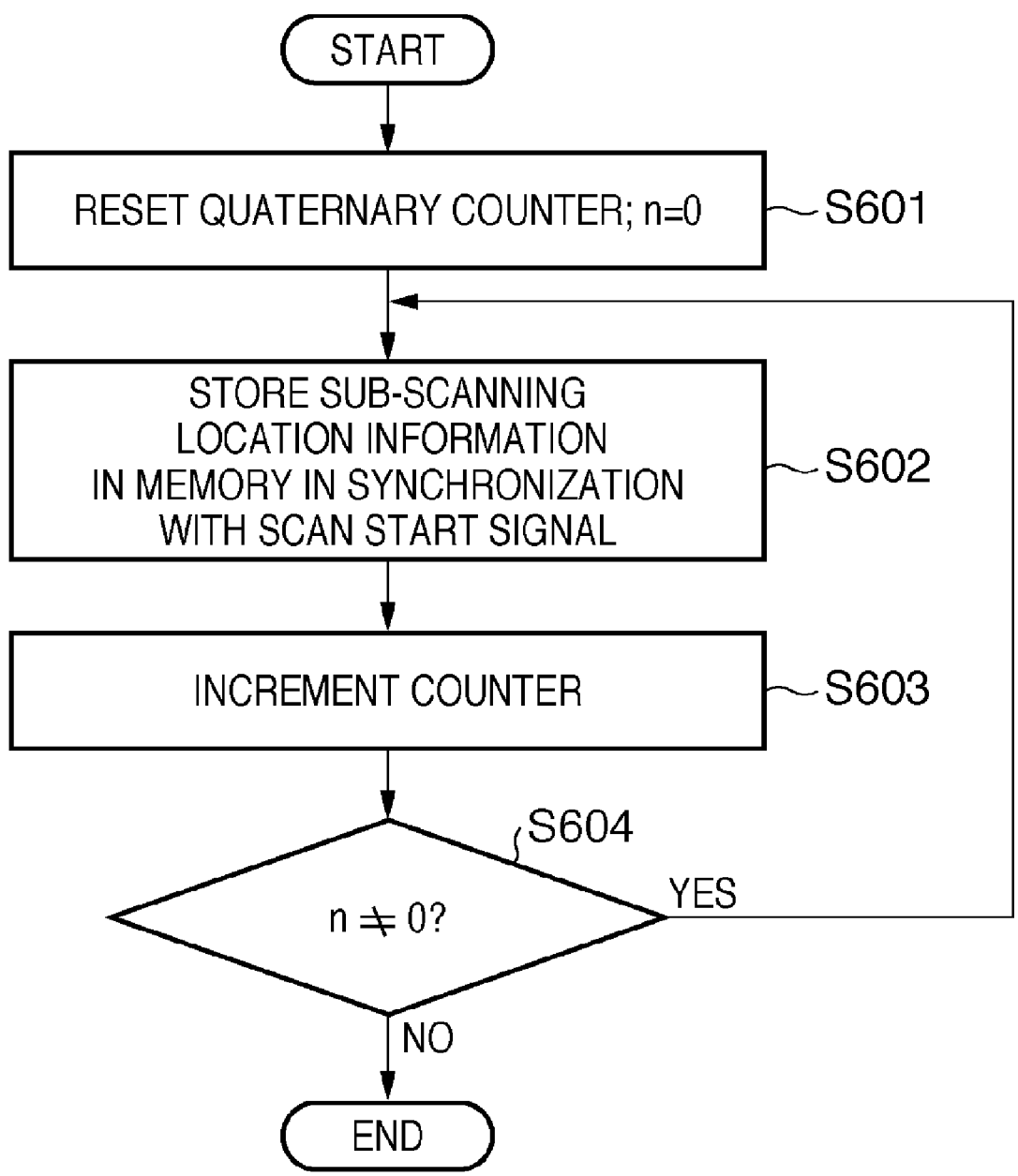
FIG. 6 is a flowchart illustrating an example of a sub-scanning location information (surface inclination amount) acquisition process according to an embodiment.

FIG. 6 is a flowchart illustrating an example of a sub-scanning location information (information indicating the amount of surface inclination, degree of pitch unevenness, and so on) acquisition process according to the present embodiment. In step S601, the processing circuit 112 resets the quaternary counter. In step S602, the processing circuit 112 stores, in the memory 503, the sub-scanning location information of the time at which the scan start signal was input. In step S603, the processing circuit 112 increments the count value n of the quaternary counter by 1. In step S604, the processing circuit 112 determines whether or not the count value n of the quaternary counter has returned to 0. Because the count value n changes from 0, to 1, 2, 3, then back to 0, then to 1 again, and so on, the count value n returning to 0 indicates that the sub-scanning location information corresponding to all of the four reflective surface has been acquired. If the count value n is not 0, this means that there is a reflective surface for which the sub-scanning location information has not yet been acquired, and therefore the process returns to step S602. However, if the count value n is 0, the present process ends.

By executing this serial process, sub-scanning location information for each surface of the polygonal mirror 105 is accumulated in the memory 503. However, as the corresponding relationship between instances of sub-scanning location information and the reflective surfaces should be maintained, the quaternary counter 505 continues to operate even after the storage is complete. It is assumed that this acquisition process is executed prior to the formation of the latent image.

(Sub-Scanning Location (Surface Inclination) Correction Process)

Figure 7:
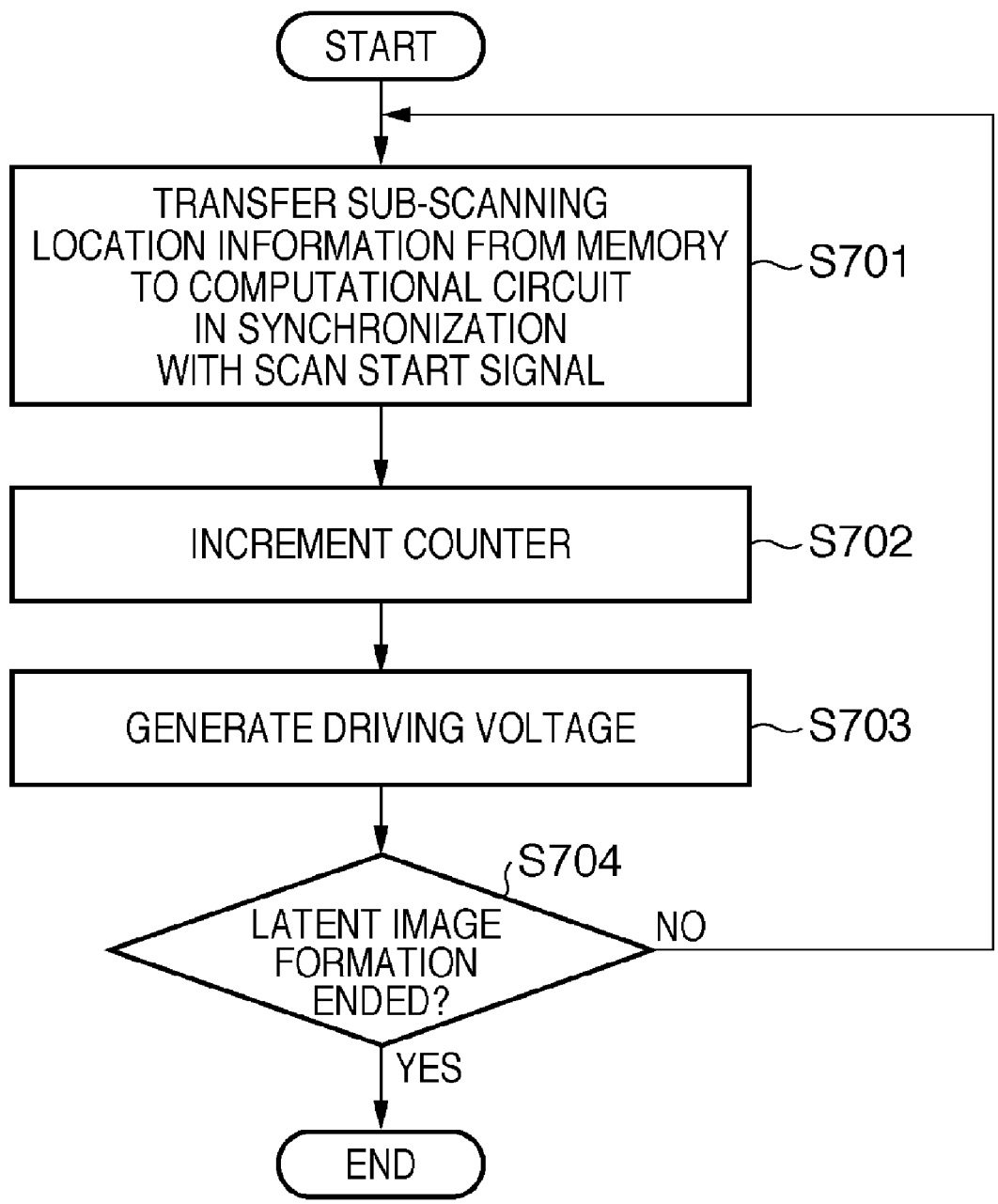
FIG. 7 is a flowchart illustrating an example of a sub-scanning location (surface inclination) correction process according to an embodiment.

FIG. 7 is a flowchart illustrating an example of a sub-scanning location (surface inclination) correction process according to the present embodiment. It is assumed that this sub-scanning position (surface inclination) correction process is executed during the formation of the latent image.

In step S701, the computational circuit 504 reads out, from the memory 503, the sub-scanning location information indicated by the current count value n. This operation transfers information regarding the surface inclination from the memory 503 to the computational circuit 504. In step S702, the quaternary counter 505 increments the count value n by 1 in synchronization with a main scan start signal.

In step S703, the computational circuit 504 emits a driving voltage to be supplied to the micromirror 109 based on the sub-scanning location information. For example, the computational circuit 504 determines a target deflection angle, through which the error in pitch in the sub-scanning direction of a plurality of scanning trajectories (main scanning lines) of which the latent image is composed are contained within a predetermined range, and outputs a driving signal of a driving voltage that complies with the determined target deflection angle. Of course, it is preferable that no error of pitch (unevenness of pitch) exists; however, a small amount is acceptable as long as the desired image quality allows for it. For this reason, the target deflection angle may be determined so that the error of pitch is contained within a predetermined range. The computational circuit 504 determines the target deflection angle so that the sub-scanning position detected by the position detection sensor 111 is corrected to a predetermined standard position. The "standard position" is, for example, the ideal sub-scanning position for a main scanning line. Details regarding this driving voltage emission process shall be given later. Accordingly, the computational circuit 504 is an example of a determination unit that determines the target deflection angle.

In step S704, the computational circuit 504 determines whether or not the latent image formation has ended. For example, the computational circuit 504 determines whether or not the latent image formation has ended in accordance with a signal from an engine control portion (not shown) that expresses the latent image formation (a latent image formation signal). If the latent image formation has not ended, the process returns to step S701 to form the next main scanning line. However, if the latent image formation has ended, the process itself comes to an end.

Figure 8:
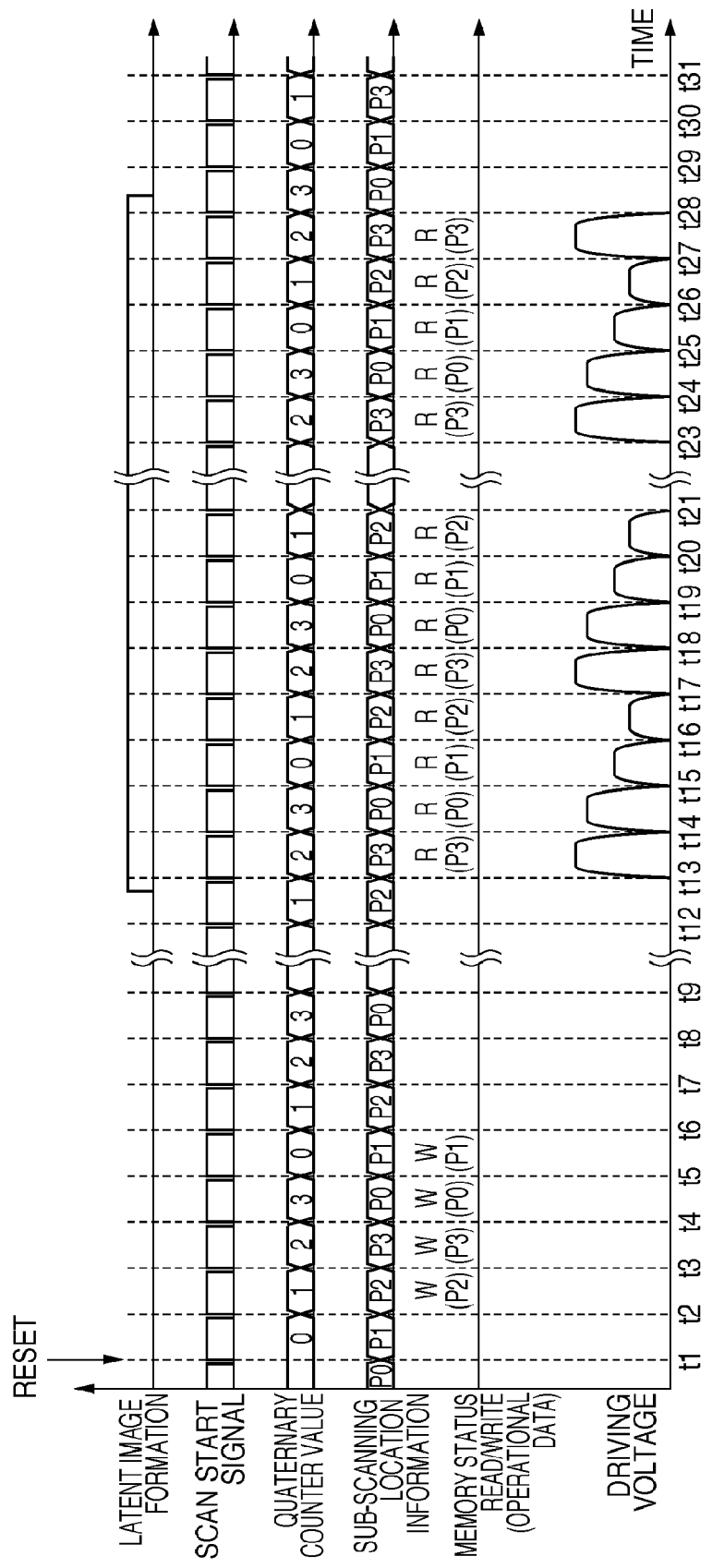
FIG. 8 is a timing chart indicating a control method for the optical scanning apparatus according to an embodiment.

FIG. 8 is a timing chart indicating a control method for the optical scanning apparatus according to the present embodiment. This chart illustrates the relationships between the latent image formation signal, the scan start signal, the count value n, the sub-scanning location information, the memory status (read or write), and the driving voltage, at various times of control.

Here, the sections spanning from t1 to t12 and t29 to t31 are sections in which the latent image is not being formed, as the latent image formation signal is low. In the sections in which the latent image is not being formed, the sub-scanning location information acquisition process is executed as per the flowchart illustrated in FIG. 6. For example, when the count value n is 0 (the section spanning from t1 to t2), sub-scanning location information P1 is stored in the memory 503.

Meanwhile, the section spanning from t13 to t28 is a section in which the latent image is being formed, as the latent image formation signal is high. For example, when the count value n is 2 (the section spanning from t13 to t14), sub-scanning location information P3 is read out from the memory 503 and a driving voltage corresponding to the value of P3 is supplied to the micromirror 109, thereby correcting the surface inclination.

(Surface Inclination Correction Specifics)

In the present embodiment, the light beam deflection cycle of the polygonal mirror 105 is divided into plural sections. The deflection cycle is the period spanning from when a certain scan start signal is inputted until the next scan start signal is input.

The "plural sections" are, for example, a first section T1 in which a latent image is not formed; a second section T2, which follows the first section and in which a latent image is formed; and a third section T3, which follows the second section and in which a latent image is not formed. Note that the computational circuit 504 is provided with a counter for identifying the section, and isolates which section that count value indicates. The computational circuit 504 and its counter are an example of a section isolation unit. The computational circuit 504 sets a target deflection angle that corresponds to the current isolated section, and generates a driving signal corresponding to that target deflection angle.

Figure 9:
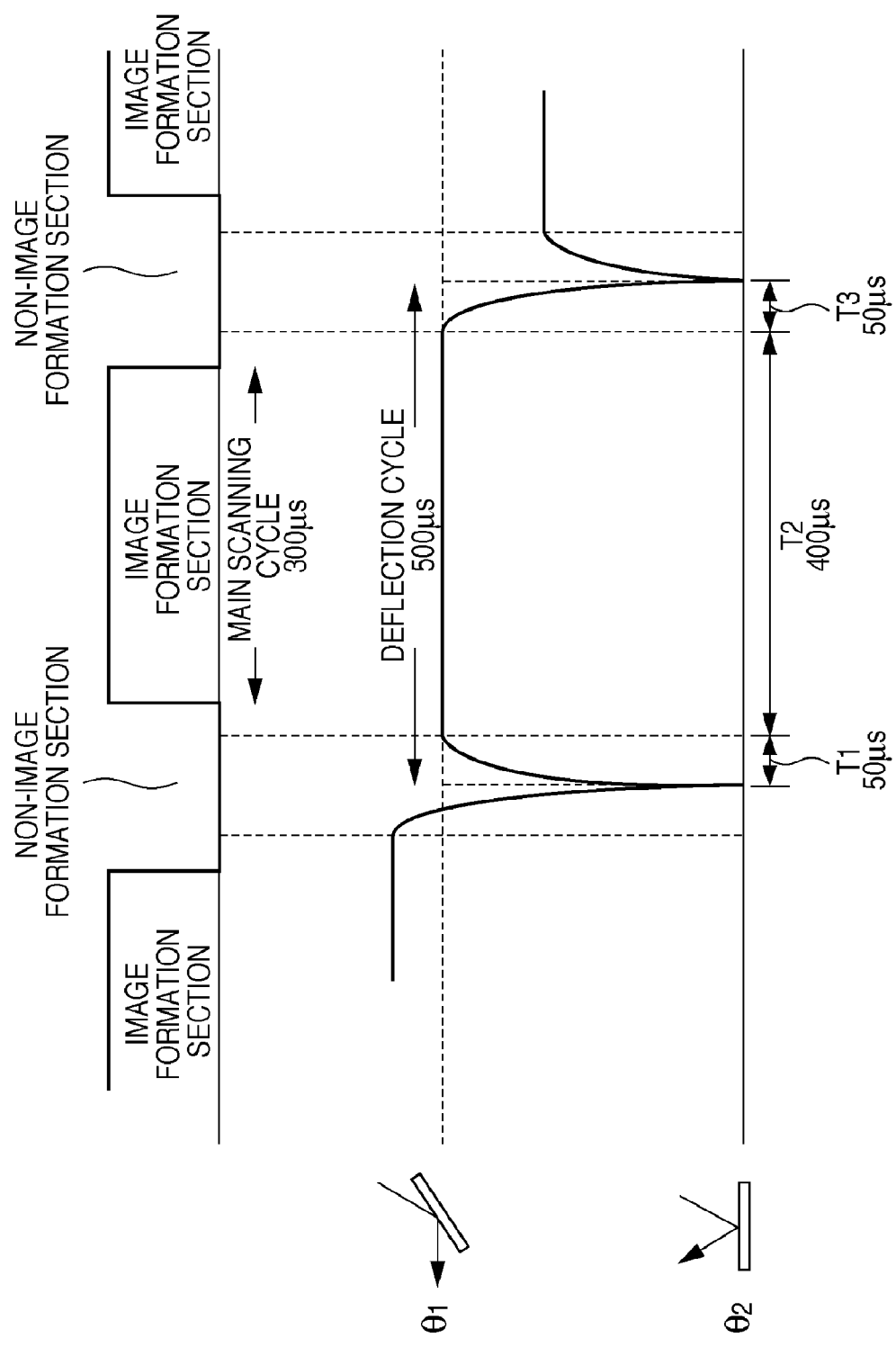
FIG. 9 is a diagram illustrating a concept of plural sections and surface inclination correction according to an embodiment.

FIG. 9 is a diagram illustrating the concept of plural sections and surface inclination correction according to the present embodiment. As illustrated in FIG. 9, in the first section T1, the computational circuit 504 controls the driving signal so that the deflection angle θ of the micromirror 109 reaches a first target deflection angle $\theta_1$. The frequency of the driving signal supplied at this time is determined so as to be less than the resonance frequency of the micromirror 109, based on this resonance frequency and the number of reflective surfaces of the polygonal mirror 105.

In the second section T2, control is performed so that the deflection angle θ of the micromirror 109 is kept at the first target deflection angle $\theta_1$. Then, in the third section, the computational circuit 504 controls the driving signal so that the deflection angle of the micromirror 109 reaches a second target deflection angle $\theta_2$. The frequency of the driving signal supplied at this time is determined so as to be less than the resonance frequency of the micromirror 109, based on this resonance frequency and the number of reflective surfaces of the polygonal mirror 105.

For example, the deflection cycle is assumed to be 500 μs, and the main scanning cycle (the time in the deflection cycle in which a latent image is being formed) is assumed to be 300 μs. These values are, however, provided merely for descriptive purposes.

Figure 10:
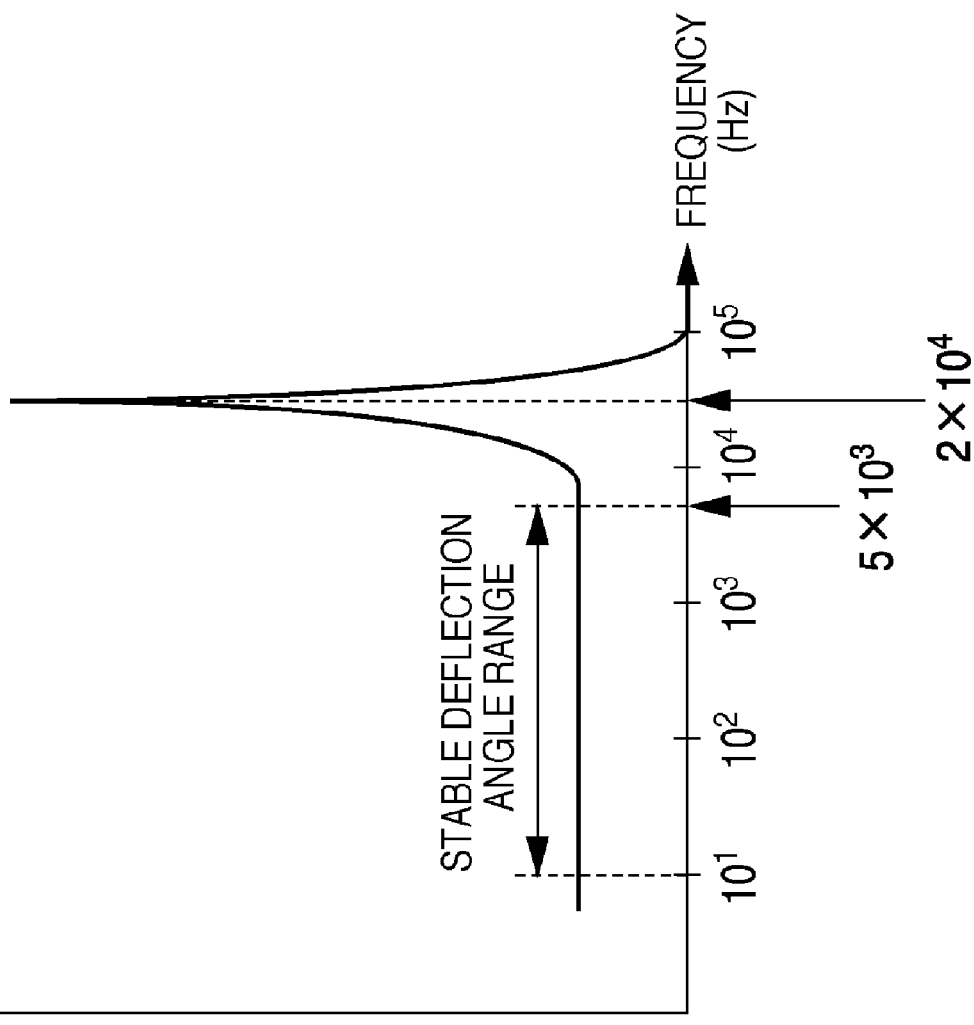
FIG. 10 is a diagram illustrating the relationship between the driving frequency of a micromirror 109 and the deflection angle, according to an embodiment.

FIG. 10 is a diagram illustrating the relationship between the driving frequency of the micromirror and the deflection angle, according to the present embodiment. Here, the resonance frequency is taken as, for example, 20 kHz. The micromirror 109 is assumed as having a property whereby fluctuation in the deflection angle caused by changes in the frequency is low in the 10 Hz to 5 kHz frequency range (this range is called the "stable deflection angle range"). In this case, it is preferable for the micromirror 109 to be supplied with a driving signal (sine wave) of a driving frequency that is within this stable deflection angle range.

In this manner, the computational circuit 504 supplies, to the micromirror 109, a driving signal of a frequency that belongs to a range capable of driving the micromirror 109 with a stable deflection angle. This makes it possible to correct the unevenness of pitch caused by the micromirror 109 at a stable level of accuracy.

It should be noted that the computational circuit 504 may supply, to the micromirror 109, a driving signal that is both of a frequency that belongs to a range capable of driving the micromirror 109 with a stable deflection angle and that has a maximum frequency that is less than the resonance frequency. As shown in FIG. 10, the maximum stable frequency in the stable deflection angle range is 5 kHz. This makes it possible to achieve a high degree of both stability and control speed.

Returning now to FIG. 9, in the first section Ti, the deflection angle θ of the micromirror 109 is brought to the first target deflection angle $\theta_1$ using a sine wave with a 5 kHz frequency, which is less than the resonance frequency of 20 kHz. The amount of time required for the deflection angle to reach the first target deflection angle $\theta_1$ can be obtained by dividing the cycle corresponding to the maximum stable frequency by the number of surfaces of the polygonal mirror 105. For example, if the maximum stable frequency is 5 kHz, the time required is 200 μs/4, or 50 μs.

In the second section T2, the deflection angle of the micromirror 109 is kept at the first target deflection angle $\theta_1$. It is necessary to keep this deflection angle at least until the latent image formation ends, the length of time of the second section T2 is set to be longer than the main scanning cycle. In FIG. 9, the length of time of the second section T2 is set to 400 μs.

In the third section T3, the deflection angle of the micromirror 109 is brought to the second target deflection angle $\theta_2$ using a sine wave with a 5 kHz frequency, which is less than the resonance frequency of 20 kHz, in the same manner as in the first section T1. The amount of time required for the deflection angle to reach the second target deflection angle $\theta_2$ is therefore also 50 μs. However, if the first target deflection angle $\theta_1$ and the second target deflection angle $\theta_2$ are different, the required amounts of times are different for each.

Figure 11:
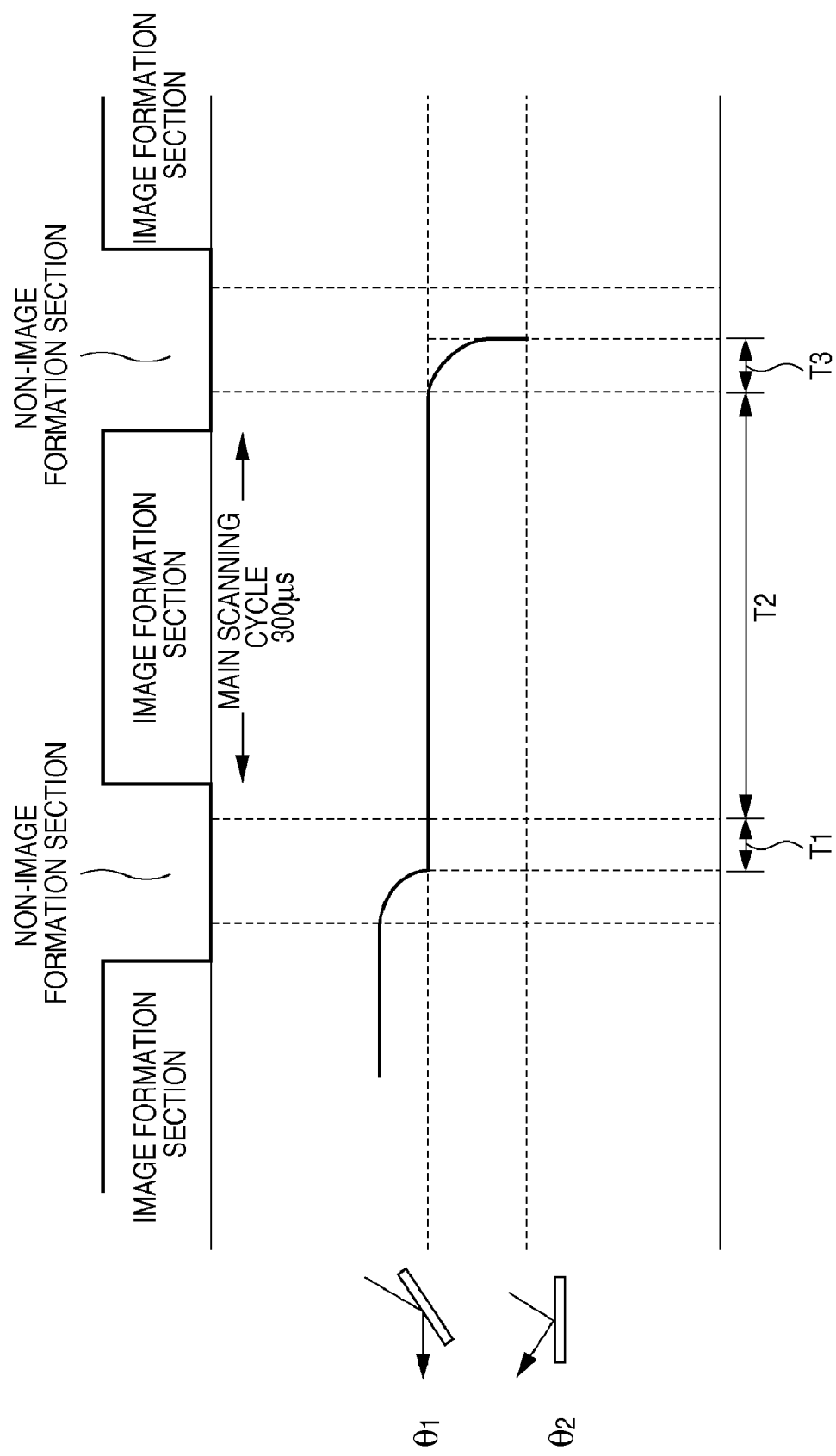
FIG. 11 is another diagram illustrating a concept of plural sections and surface inclination correction according to an embodiment.

FIG. 11 is another diagram illustrating the concept of plural sections and surface inclination correction according to the present embodiment. In FIG. 9, the first target deflection angle $\theta_1$ is set to a deflection angle necessary to correct the error in the sub-scanning position to a standard value, whereas the second target deflection angle $\theta_2$ is set to zero. However, the second target deflection angle $\theta_2$ may be set to a value that reduces the micromirror 109 to minimal operations, as illustrated in FIG. 11.

As described above, if the surface inclination amount differs for each reflective surface, the first target deflection angles $\theta_1$ also differ for each reflective surface. Accordingly, the computational circuit 504 may, for example, set the current second target deflection angle $\theta_2$ to the same value as the first target deflection angle $\theta_1$ in the first section T1 that comes next. In such a case, the micromirror 109 is stopped in T1 and T2, and is driven only during T3. Accordingly, the computational circuit 504 is an example of a setting unit that sets the second target deflection angle $\theta_2$ in the current deflection cycle to the same value as the first target deflection angle $\theta_1$ in the next deflection cycle.

Figure 12:
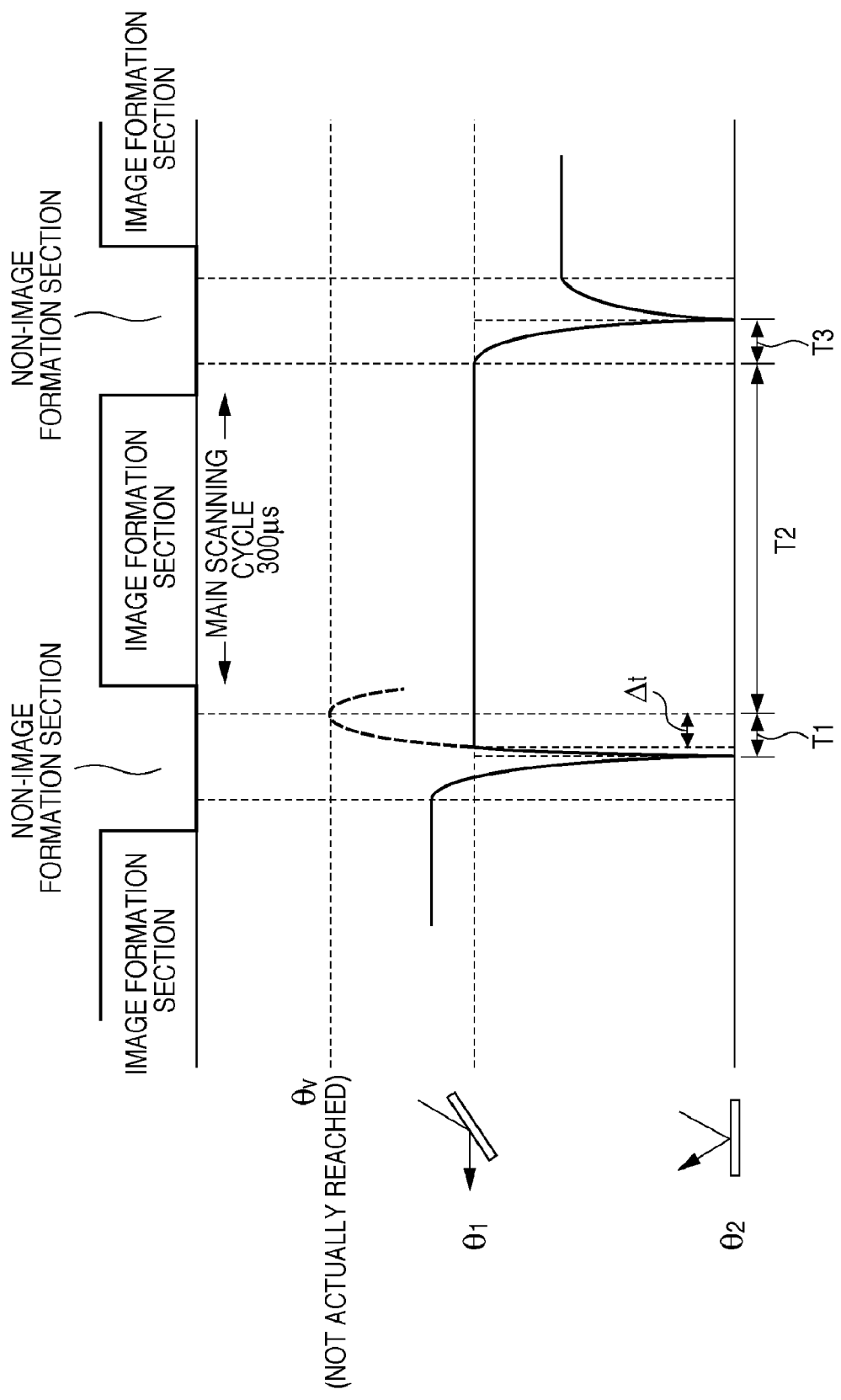
FIG. 12 is yet another diagram illustrating a concept of plural sections and surface inclination correction according to an embodiment.

FIG. 12 is yet another diagram illustrating the concept of plural sections and surface inclination correction according to the present embodiment. In the example shown in FIG. 9, the micromirror 109 is controlled so that the deflection angle θ actually becomes the first target deflection angle $\theta_1$. However, the computational circuit 504 may supply, to the micromirror 109, a driving signal that brings the deflection angle to a virtual target deflection angle θv, which is larger than the first target deflection angle $\theta_1$, in the first section T1, as illustrated in FIG. 12. In this case, the deflection angle θ can reach the first target deflection angle $\theta_1$ in a shorter amount of time. In other words, the amount of time required for the deflection angle to reach the first target deflection angle $\theta_1$ can be shortened by Δt. Note that the deflection angle θ does not actually reach the virtual target deflection angle θv. This is because the deflection angle θ is fixed at the first target deflection angle $\theta_1$ by the computational circuit 504 upon the deflection angle θ reaching the first target deflection angle $\theta_1$.

Of course, the computational circuit 504 may supply, to the micromirror 109, a driving signal that brings the deflection angle to a virtual target deflection angle θv, which is larger than the second target deflection angle $\theta_2$, in the third section T3. Doing so achieves the same effects obtained with respect to the first section.

As illustrated in FIG. 9, the deflection angle of the micromirror 109 is kept at the first target deflection angle $\theta_1$ during the image formation section by making the second section T2 longer (for example, 400 μs) than the main scanning cycle (for example, 300 μs) that expresses the image formation section. Setting the image formation section to fall within the second section T2 in such a manner prevents the micromirror 109 from being driven during the writing of a latent image. Error in the main scanning line can be reduced even further as a result.

In the embodiment described thus far, the optical scanning apparatus detects the amount of surface inclination of the polygonal mirror 105 using the position detection sensor 111, and corrects the deflection angle in accordance with the detected amount of surface inclination. However, the position detection sensor 111 may be omitted, and an amount of surface inclination of the reflective surfaces measured during the manufacturing process of the optical scanning apparatus and stored in the memory 503 may be used instead.

Figure 13:
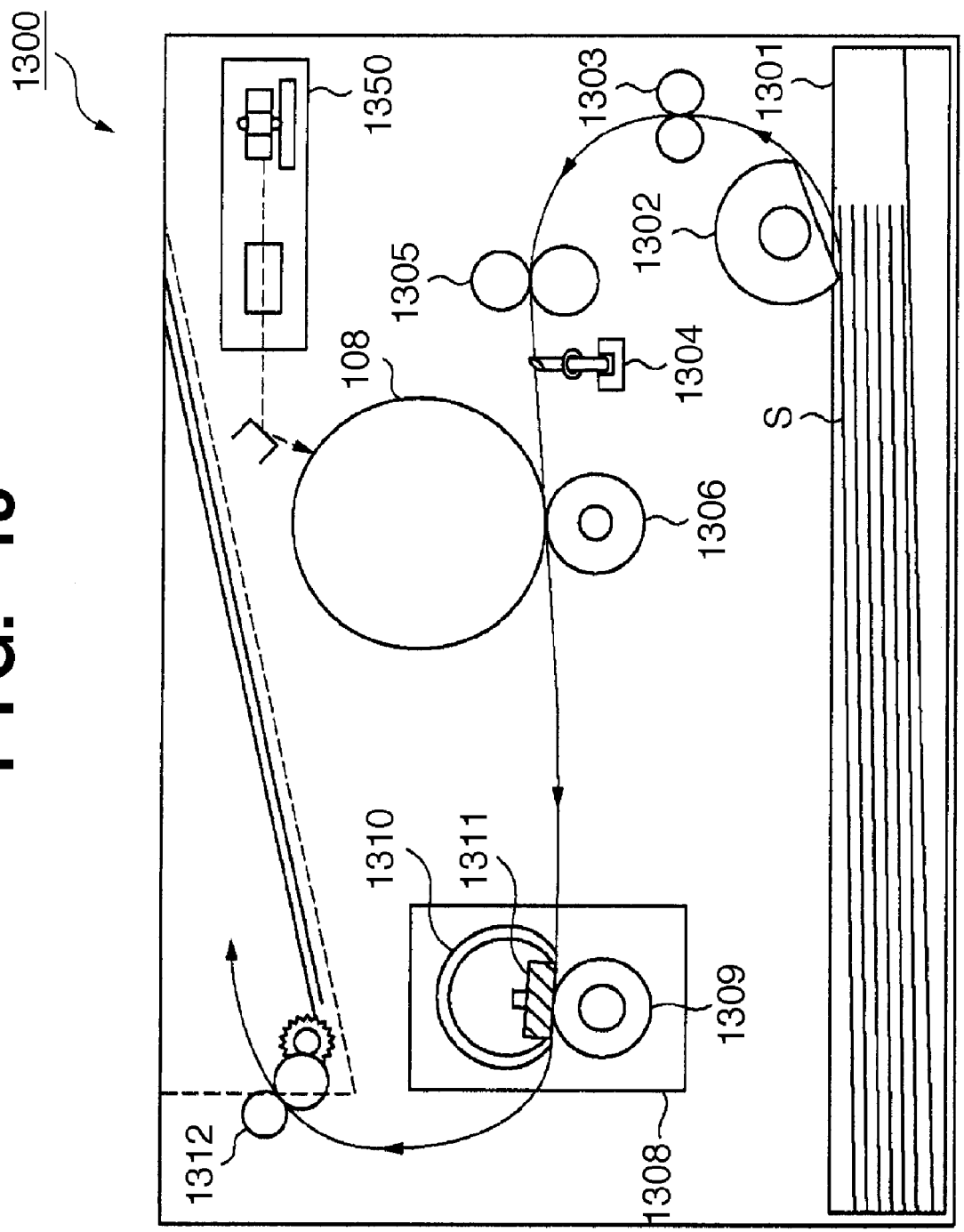
FIG. 13 is a diagram illustrating a general cross-section of an image forming apparatus according to an embodiment.
Figure 14:
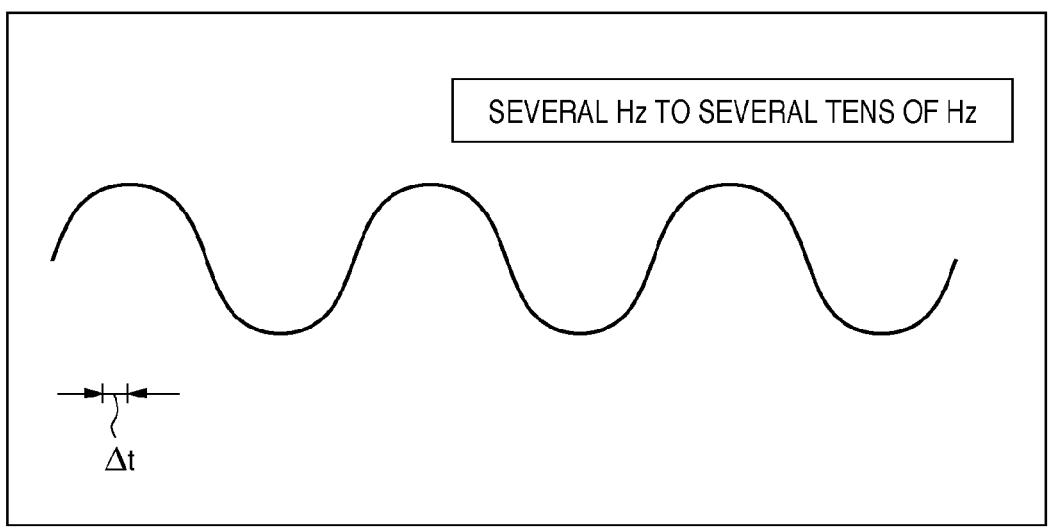
Figure 15:
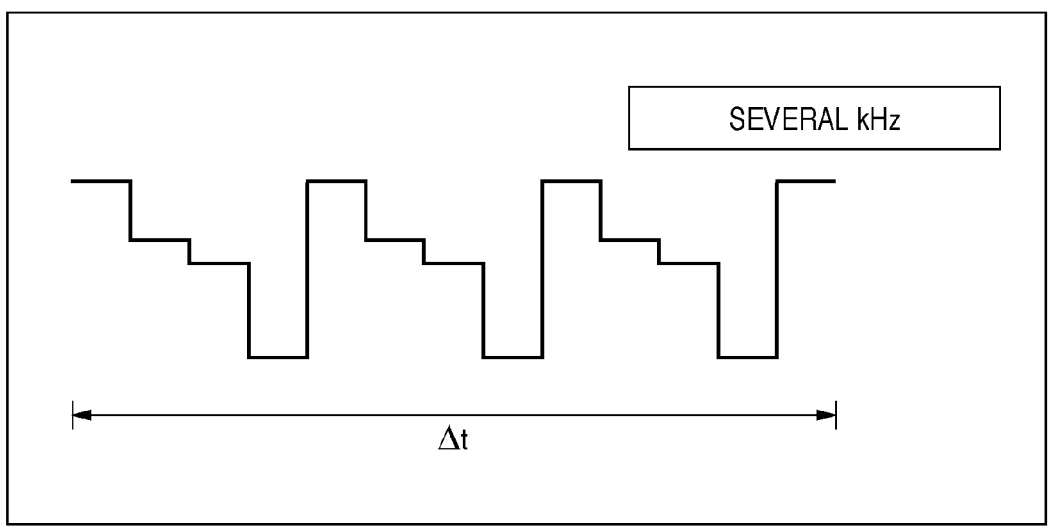
FIG. 15 is a diagram illustrating an example of unevenness of pitch in the main scanning lines caused by surface inclination (that is, unevenness of pitch caused by high-frequency components).
Figure 16:
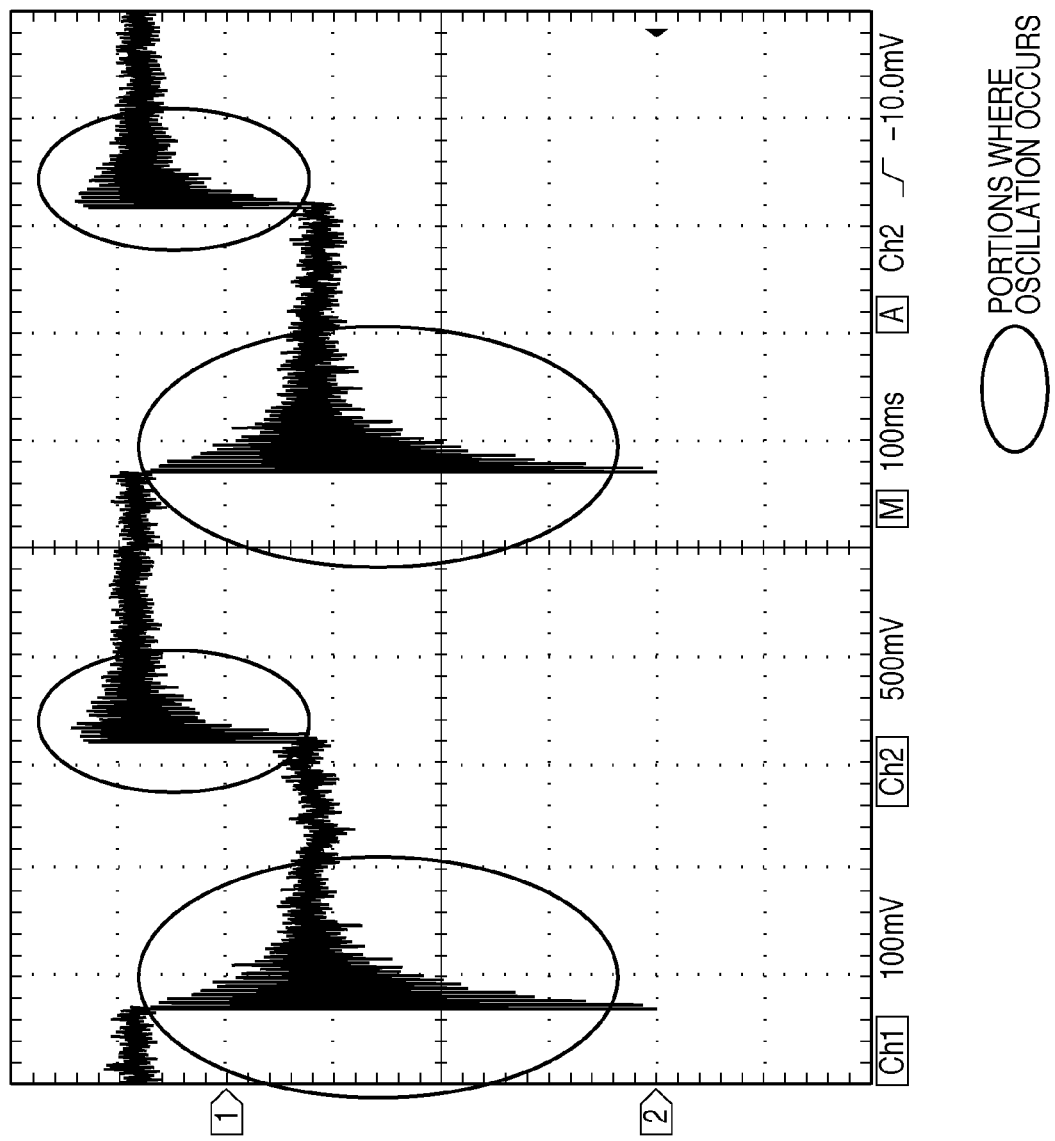
FIG. 16 is a diagram illustrating an oscillation phenomenon occurring in a resonant driving type micromirror.

FIG. 13 is a diagram illustrating a general cross-section of an image forming apparatus according to the present embodiment. Note that an image forming apparatus 1300 is provided with an optical scanning apparatus 1350, which is an optical scanning apparatus that forms latent images on the surface of a photosensitive member as described above. Through this, the error of pitch of the main scanning lines in the sub-scanning direction is kept within a predetermined range, which improves the quality of the formed image.

A feed cassette 1301 stores multiple pieces of printing medium S. The printing medium S may also be called paper, sheets, transfer material, and so on. A feed roller 1302, driven by a feed solenoid (not shown), separates the printing medium S stored in the feed cassette 1301 on a sheet-by-sheet basis and feeds each sheet to a transport roller 1303. The transport roller 1303 carries the printing medium S further down the line.

A feed sensor 1304 detects the passage of both the front and back ends of the printing medium S. A registration roller 1305 is a type of transport roller that carries the printing medium S. In particular, the registration roller 1305 is used to adjust the timing at which the front end of the printing medium S is carried to an image formation portion (made up of a transfer roller 1306 and a photosensitive drum 108).

The printing medium S, onto which has been transferred a developer (for example, toner) image by the image formation portion, is then carried to a fixing device 1308. The fixing device 1308 includes a pressure roller 1309, a fixing film 1310, and a ceramic heater 1311, for fixing the developer image to the printing medium. After undergoing the pressurized fixing, the printing medium S is discharged to the exterior of the device by a discharge roller 1312.

As described thus far, according to the present embodiment, it is possible to positively correct "square wave form" "unevenness of pitch caused by high-frequency components" arising due to surface inclination by using a resonant driving type mirror, while also suppressing oscillation phenomena.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2007-180153, filed Jul. 09, 2007, which is hereby incorporated by reference herein in its entirety.

What is claimed is:

1. An optical scanning apparatus that forms a latent image upon a photosensitive member, the apparatus comprising:
   a rotational polygonal mirror that is provided with a plurality of reflective surfaces that deflect a light beam in a main scanning direction;
   a resonant driving type mirror that deflects the light beam in a sub-scanning direction so as to reduce the influence of surface inclination in the reflective surfaces of said rotational polygonal mirror relative to the rotational axis of said rotational polygonal mirror; and
   a driving signal supply unit that supplies a driving signal of a frequency less than the resonance frequency of said resonant driving type mirror to said resonant driving type mirror in a first section, in order to bring the deflection angle of said resonant driving type mirror to a first target deflection angle, keeps the deflection angle of said resonant driving type mirror at the first target deflection angle in a second section, and supplies a driving signal of a frequency less than the resonance frequency of said resonant driving type mirror to said resonant driving type mirror in a third section, in order to bring the deflection angle of said resonant driving type mirror to a second target deflection angle, the first section being a section in which the latent image is not formed, the second section being a section that follows the first section and in which the latent image is formed, and the third section being a section that follows the second section and in which the latent image is not formed, and the sections being included in the light beam deflection cycle of said rotational polygonal mirror.

2. The optical scanning apparatus according to claim 1, wherein said driving signal supply unit supplies, to said resonant driving type mirror, a driving signal of a frequency that belongs to a range capable of driving said resonant driving type mirror with a stable deflection angle.

3. The optical scanning apparatus according to claim 2, wherein said driving signal supply unit supplies, to said resonant driving type mirror, a driving signal that is a frequency that belongs to a range capable of driving said resonant driving type mirror with a stable deflection angle and that has a maximum frequency that is less than the resonance frequency.

4. The optical scanning apparatus according to claim 1, further comprising a determination unit that determines the first target deflection angle so that the error of pitch in the sub-scanning direction of a plurality of scanning trajectories of which the latent image is composed is contained within a predetermined range.

5. The optical scanning apparatus according to claim 4, further comprising a detection unit that detects a sub-scanning position of the light beam for each of the reflective surfaces, wherein said determination unit determines the first target deflection angle so that the sub-scanning position detected by said detection unit is corrected to a predetermined standard position.

6. The optical scanning apparatus according to claim 1, further comprising a setting unit that sets the second target deflection angle in the current deflection cycle to the same value as the first target deflection angle in the next deflection cycle.

7. The optical scanning apparatus according to claim 1, wherein in the first section, said driving signal supply unit supplies, to said resonant driving type mirror, a driving signal that brings the deflection angle to a virtual target deflection angle that is larger than the first target deflection angle.

8. The optical scanning apparatus according to claim 1, wherein in the first section, said driving signal supply unit supplies, to said resonant driving type mirror, a driving signal that brings the deflection angle to a virtual target deflection angle that is larger than the second target deflection angle.

9. The optical scanning apparatus according to claim 1, wherein when a square wave form driving signal is inputted into said resonant driving type mirror, said resonant driving type mirror oscillates on at least one of the rising edge of the square wave form driving signal and the falling edge of the square wave form driving signal.

10. An image forming apparatus, comprising:
the optical scanning apparatus according to claim 1;
a photosensitive member, on the surface of which a latent image is formed by a light beam outputted from said optical scanning apparatus;
a developing device that develops the latent image into a developer image using developer;
a transfer device that transfers the developer image onto a printing medium; and
a fixing device that fixes the developer image to the printing medium.

11. A control method for an optical scanning apparatus that forms a latent image upon a photosensitive member using a rotational polygonal mirror that is provided with a plurality of reflective surfaces that deflect a light beam in a main scanning direction, and a resonant driving type mirror that deflects the light beam in a sub-scanning direction so as to reduce the influence of surface inclination in the reflective surfaces of the rotational polygonal mirror relative to the rotational axis of the rotational polygonal mirror,
wherein the light beam deflection cycle of the rotational polygonal mirror includes a first section in which the latent image is not formed, a second section that follows the first section and in which the latent image is formed, and a third section that follows the second section and in which the latent image is not formed, and
the control method comprises the steps of:
supplying a driving signal of a frequency less than the resonance frequency of the resonant driving type mirror to the resonant driving type mirror in the first section, in order to bring the deflection angle of the resonant driving type mirror to a first target deflection angle;
keeping the deflection angle of the resonant driving type mirror at the first target deflection angle in the second section; and
supplying a driving signal of a frequency less than the resonance frequency of the resonant driving type mirror to the resonant driving type mirror in the third section, in order to bring the deflection angle of the resonant driving type mirror to a second target deflection angle.

* * * * *